Jan. 17, 1950  H. G. MARTIN  2,495,013
FOUNTAIN PEN
Filed March 7, 1945
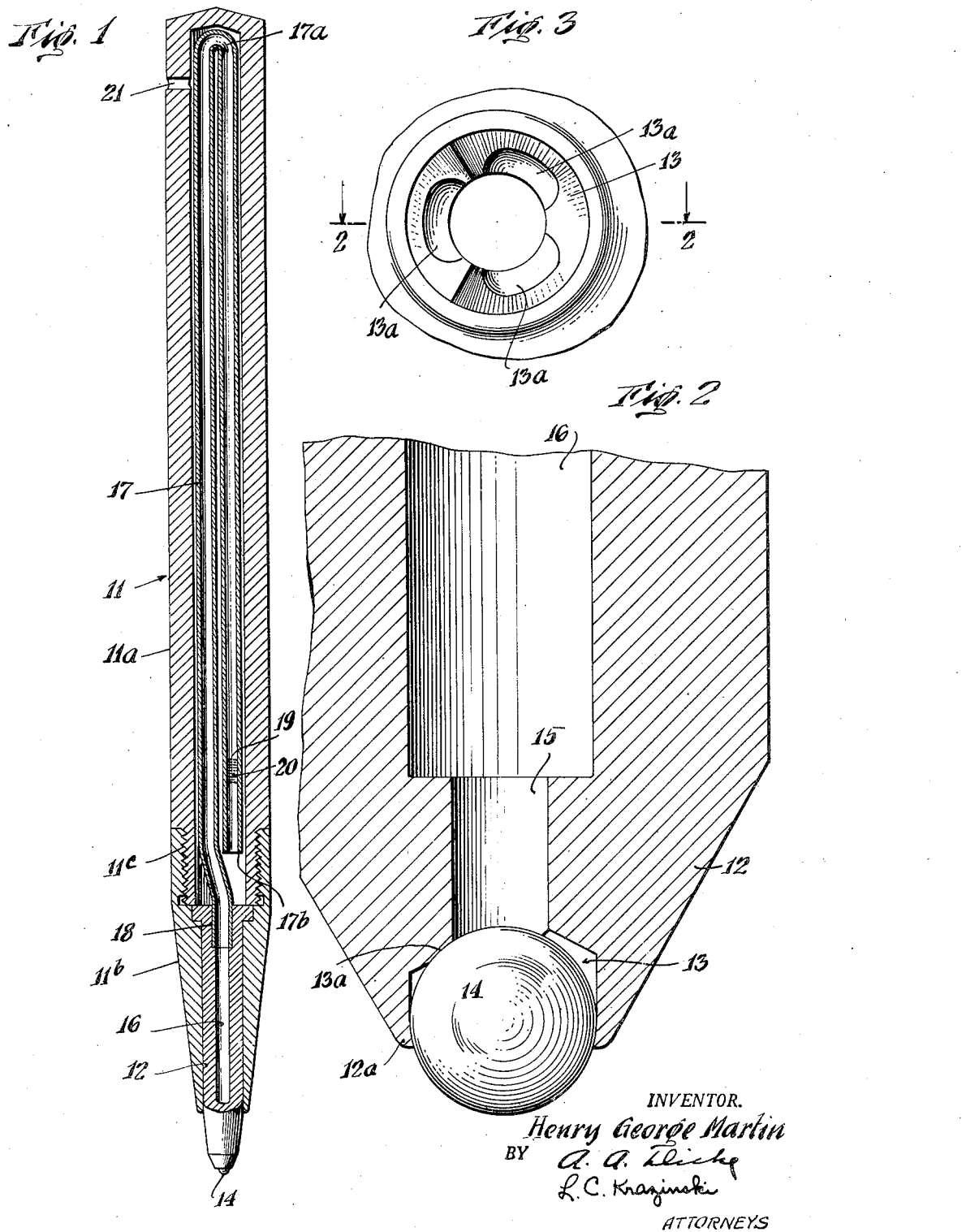
INVENTOR.
Henry George Martin Patented Jan. 17, 1950

2,495,013

UNITED STATES PATENT OFFICE 2,495,013

FOUNTAIN PEN

Henry George Martin, Buenos Aires, Argentina, assignor, by mesne assignments, to Eversharp, Inc., Chicago, Ill., a corporation of Delaware Application March 7, 1945, Serial No. 581,395

3 Claims. (Cl. 120—42.08)

This invention relates to fountain pens and has for an object to provide a fountain pen which will give an indication of the approaching exhaustion of the ink supply so that the user may replenish the supply of ink before it is completely exhausted.

Another object is to provide such a pen of the type in which the writing or marking member consists of a ball rotatably fitted in a seat within which it rotates during writing, thereby transferring the ink to the paper.

Another object is to accomplish the desired result by using a viscous ink stored in a reservoir of relatively small cross-section and fed toward the writing ball by continuous bodily movement (without commingling), the main portion of the ink being of one color which is immediately followed by a slug of ink of another color so that when the color of the lines traced by the pen changes, the user will be notified that the supply of ink is almost exhausted.

Another object is to accomplish these results in a pen in which one end of the ink supply communicates with the ball and the other end communicates continuously with the atmosphere.

Another object is to improve devices of the type disclosed in Laszlo J. Biro application Serial Number 516,441, filed December 31, 1943, now Patent 2,416,896, of March 4, 1947, and particularly to provide pens of the type therein disclosed with a charge of ink the main portion of which is of one color and a very small terminal portion of which is of another color so as to apprize the user of approaching exhaustion of the ink.

Further objects and advantages of this invention will be apparent from consideration of the specification as illustrated by the accompanying drawings of an illustrative embodiment of the invention, in which drawings:

Fig. 1 is an axial cross-section of a pen illustrating the present invention, the tip portion of the pen being shown in full;

Fig. 2 is a cross-section of the tip portion on a greatly enlarged scale;

Fig. 3 is a view of the ball seat with the ball removed, viewed as from below in Fig. 2.

Referring to said drawings, the pen may consist of a housing 11 consisting of the main body portion 11a and a tip housing portion 11b connected together as by screw threads 11c. Within said tip housing section 11b is located the tip section 12 of the pen proper. Said tip section is provided with a seating recess 13 within which is received a ball 14 preferably of a hard metal and made very accurately spherical. The tip section is formed with a bore 15 of a diameter approximately half the ball diameter and communicating with a larger bore 16. The ball seat is preferably made so as to present to the ball a plurality of spherical seating pads 13a (preferably three in number, as shown). This may be accomplished by first forming the bottom of the seat as a triangular pyramid and then pressing the ball or other spherically-shaped surface against the seat so as to swedge the seat to form the spherical seating pads 13a. After the ball 14 is placed within its seat, the lip portion 12a of the tip section 12 is formed against the ball 14 as by swedging or spinning. Since the lip 12a extends beyond the center of the ball it holds the ball in place within its seat. The fit is such that the ball can rotate within its seat but the clearance is kept very small, as disclosed in more detail hereinafter.

Connecting with the bore 16 is shown a tubular reservoir consisting of a tube 17 of copper or the like extending into an enlarged perforation 18 in the tip section 12 and preferably soldered or brazed therein. The internal diameter of the reservoir tube 17 may be and preferably is the same as that of perforation 16.

It will be noted that the tube 17 is bent upon itself as at 17a and extends toward the tip of the pen, terminating at 17b, the end thereof being open, as shown. It is, of course, to be understood that the tube may be formed with any number of limbs instead of the two shown and it may be coiled in any other manner which will enable it to be contained within a housing of desirable form. The important consideration is that the reservoir whether made from tubing or otherwise has a small cross-section throughout substantially its entire length, i. e. a cross-section of capillary dimensions, viz. of such dimensions that the ink will not flow therefrom by gravity. Experiments have indicated that the cross-sectional area should not exceed about 4.7 square millimeters (i. e., in the case of a circular cross-section, a diameter of not more than about 2.5 millimeters). This is based upon the use of an ink having a viscosity of between about 15 and 30 poise at 37° C.

It is contemplated that the diameter of the ball will be about 1 millimeter and that it be made of hard material, such as steel, formed very accurately with a very smooth exterior. The fitting in the seat should be such that the gap between the lip and the ball be no greater than about .002 millimeter (.00008 inch) to about .008 millimeter (.00032 inch). In view of the narrowness of the gap and the capillary effect upon the extremely thin film of ink within the gap, it is not possible for the ink to flow through the gap as long as the ball does not rotate, even though the writing point be held downwardly for long periods. This becomes clear when it is known that experiments have shown that a pressure of some thousands of pounds per square inch is needed to force ink through the gap at a rate approximating that which occurs during normal writing. However, during writing the ink is carried through the gap by the rotation of the ball so that the exposed part of the ball is at that time covered with a film of ink which is transferred to the paper or other writing surface. The ball seat and the bores 15 and 16, and the reservoir tube, must be completely filled with ink so that no bubbles or air spaces remain. The ink extends as a continuous body, strand, or column into the reservoir so that when the reservoir is filled to its maximum capacity the end of the column is fairly close to the open end 17b of the reservoir 2. As the ink is consumed, by being transferred through the gap between the ball and the lip, the ink is moved bodily along the reservoir tube without movement of one part of the ink relative to the other. Most of the ink charge is of the color desired by the user, for example, black or blue, this ink extending from the ball to about the position indicated at 19. This ink is followed by a slug of ink 20 of different color, as, for example, red. The ink being highly viscous or pasty, there is no appreciable commingling of the ink of different colors and during use the column of ink moves along toward the ball seriatim, the red ink 20 following right along behind the main mass of ink. It will be seen that when the ink has been almost used up, the specially colored ink 20 will approach and make contact with the ball and thereupon be carried out upon the paper. This change of color, of course, serves to notify the user that the pen is almost empty and that a new charge of ink must be supplied. This will be done by the use of special apparatus which forces the ink into the reservoir under pressure until the reservoir is substantially filled, whereupon an additional drop or so of distinctively colored ink is added.

It is important that the end of the ink column be subjected to atmospheric pressure. Ordinarily this may be effected through making the threads 11c sufficiently loose for the purpose. However, it is preferred to provide an opening, such as 21, in the housing to serve as an air vent.

Various changes may be made in the invention. While in the case shown, the reservoir is shown as rigidly connected with the tip portion which carries the writing ball, it is to be understood that it may take the form of a separate refill unit or refill cartridge. It is also to be understood that the invention is applicable to the type of pens shown in United States Patents 2,258,841 and 2,265,055, issued on the application of Laszlo J. Biro.

The invention is not intended to be limited to the form shown, which is to be understood as illustrative only and not as limiting, as various changes in construction and arrangement may be made, all coming within the scope of the claims which follow:

I claim:

1. The combination in a fountain pen of a writing point, an ink reservoir including an ink-conveying tube of capillary dimensions communicating with said writing point and containing a main supply of viscous ink for feeding to said point, and a terminal slug of ink having a distinctive color characteristic in contact with and movable through said tube with said main ink supply adjacent the end thereof, whereby deposit of said terminal ink on a writing surface by said point serves to visually indicate on said surface the approaching exhaustion of said ink supply in said reservoir.

2. The combination in a fountain pen of a rotatably supported ball point adapted to apply an ink trace to a writing surface, an ink reservoir including an ink-conveying tube of capillary dimensions communicating with said writing ball and containing a column of viscous ink movable through said tube as a continuous vein to said ball, the terminal portion of said column furthest from said ball being composed of ink having a color contrasting with the color of the ink of said column, whereby the appearance of said terminal portion in said trace serves to visually indicate on said writing surface the approaching exhaustion of said ink supply in said reservoir.

3. In a writing implement, a writing ball adapted to apply an ink trace to a writing surface, a socket in which the ball is rotatably mounted, a feed channel opening forwardly into the socket, and a reservoir comprising an ink-holding conduit which is adapted to hold the entire supply of ink for the writing implement in the form of a continuous vein and is of such cross sectional area relative to the flow characteristics of the ink as to maintain the continuity of the ink vein irrespective of the position of the writing implement, said conduit being connected with said feed channel and communicating at its other end with a vent, and a continuous column of viscous ink in said conduit, the terminal portion of said column furthest from said ball being composed of ink having a color contrasting with the color of the ink of said column, whereby the appearance of said terminal portion in said trace serves to visually indicate on said writing surface the approaching exhaustion of said ink supply in said reservoir.

HENRY GEORGE MARTIN.

REFERENCES CITED

The following references are of record in the file of this patent:

UNITED STATES PATENTS

| Number | Name | Date |
|---|---|---|
| 1,179,086 | Foster | Apr. 11, 1916 |
| 1,271,457 | Gaines | July 2, 1918 |
| 1,327,729 | Poschal | Jan. 13, 1920 |
| 1,527,971 | Forsell | Mar. 3, 1925 |
| 1,885,171 | Balmer | Nov. 1, 1932 |
| 2,265,055 | Biro | Dec. 2, 1941 |
| 2,361,478 | Jennings | Oct. 31, 1944 |
| 2,397,229 | Biro | Mar. 26, 1946 |

FOREIGN PATENTS

| Number | Country | Date |
|---|---|---|
| 498,997 | Great Britain | 1939 |
| 564,172 | Great Britain | Sept. 15, 1944 |
| 564,173 | Great Britain | Sept. 15, 1944 |